United States Patent
Buelow et al.

(10) Patent No.: US 7,198,761 B2
(45) Date of Patent: Apr. 3, 2007

(54) VEHICLE HYDROGEN FUEL SYSTEM

(75) Inventors: Jason W Buelow, Livonia, MI (US); Doanh Tran, Bloomfield, MI (US); Thomas S Moore, Oxford, MI (US); Mohsen D Shabana, Ann Arbor, MI (US); Christopher E Borroni-Bird, Oakland Township, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 643 days.

(21) Appl. No.: 10/315,548

(22) Filed: Dec. 10, 2002

(65) Prior Publication Data

US 2004/0172943 A1  Sep. 9, 2004

Related U.S. Application Data

(60) Provisional application No. 60/339,183, filed on Dec. 10, 2001.

(51) Int. Cl.
- *B32B 5/02* (2006.01)
- *B32B 27/04* (2006.01)
- *B01J 10/00* (2006.01)
- *B01J 7/00* (2006.01)
- *H01M 8/04* (2006.01)

(52) U.S. Cl. .................. 422/109; 422/110; 422/111; 422/129; 422/105; 48/61; 429/19; 429/24; 429/17

(58) Field of Classification Search ............ 422/197 R; 220/905
See application file for complete search history.

(56) References Cited

U.S. PATENT DOCUMENTS

| | | | | |
|---|---|---|---|---|
| 3,210,157 | A * | 10/1965 | Lewis, Jr. et al. | 423/648.1 |
| 4,411,240 | A * | 10/1983 | Kravetz | 123/557 |
| 4,488,517 | A * | 12/1984 | Yoon | 123/3 |
| 4,488,518 | A * | 12/1984 | Wohlfarth | 123/41.49 |
| 6,223,526 | B1 * | 5/2001 | Wissler et al. | 60/286 |
| 6,253,743 | B1 * | 7/2001 | Hyodo et al. | 123/520 |
| 6,924,054 | B2 * | 8/2005 | Prasad et al. | 429/34 |

\* cited by examiner

*Primary Examiner*—Glenn Caldarola
*Assistant Examiner*—Kaity Handal
(74) *Attorney, Agent, or Firm*—Ralph E. Smith (57) ABSTRACT

A hydrogen fuel system for a vehicle includes a fuel tank having a fuel inlet for receiving a borohydride fuel into a fuel holding portion of an internal cavity, and a waste inlet arranged to receive the waste liquid generated by an on-board hydrogen reaction process. The waste liquid is received into a waste liquid portion of the internal cavity. An expandable divider element is positioned within the tank to keep the fuel holding portion of the internal cavity separate from the waste liquid holding portion. The waste liquid holding portion can be positioned within the internal cavity so as to allow heat from the waste liquid to preheat the fuel stored in the fuel holding portion.

9 Claims, 6 Drawing Sheets

VEHICLE HYDROGEN FUEL SYSTEM

CROSS REFERENCES TO RELATED APPLICATIONS

This application claims the benefit of U.S. Provisional Application No. 60/339,183 filed Dec. 10, 2001.

BACKGROUND OF INVENTION

1. Field of the Invention

The present invention generally relates to hydrogen generation fuel systems for a motor vehicle, and more specifically, to a fuel delivery and storage arrangement for a hydrogen fuel system.

2. Background Art

Generally, fossil fuels, namely hydrocarbons, provide the fuel required to operate the majority of the world's combustion engines. However, the shortage of hydrocarbons have led to the development of engine arrangements that use alternative fuel sources.

One alternative fuel source is hydrogen. Hydrogen is an attractive fuel source because it is the most abundant element in the universe and can typically fuel conventional engines with only minor modifications to the engines. Furthermore, hydrogen burns relatively pollution free, and a large weight percentage of the hydrogen can be converted to power engines as compared to, for example, gasoline. In addition to being used directly as a fuel in combustion engines, hydrogen can also be used in a variety of fuel cells through electrochemical oxidation.

Several methods of storing and/or generating hydrogen have been developed. One such method teaches the physical storing of hydrogen as a compressed gas or as a low temperature liquid in high pressure cylinders. However, liquefying the hydrogen requires a substantial amount of energy, obtaining and maintaining extremely low temperatures on a vehicle is very difficult, and fuel is lost over time due to evaporation and boil-off. In addition, the high pressure cylinders themselves pose problems due to their bulk and limited storage capacity.

In addition to the physical storage method described above, chemical methods of storing hydrogen have also been developed. One such chemical method includes reforming hydrogen containing fuels such as methanol or other hydrocarbons. However, this method requires a significant input of heat and does not solve the CO and $CO_2$ emission problem due to the presence of carbon. Another chemical method available is the storing of hydrogen in reversible hydrides. However, this method is expensive, has very low storage efficiency by weight of hydrogen, and may require thermal energy to separate the hydrogen and the hydride. A third method is the production of hydrogen through the use of alkali metal hydride reactions. However, this method is associated with difficulties in controlling such reactions.

In order to overcome the problems of the above described methods for storing and producing hydrogen, it is currently known to utilize an aqueous solution to produce and store hydrogen. Using this approach, pure hydrogen is produced as required through the use of a catalytic reaction. The use of such an aqueous solution to store and generate hydrogen allows for the creation of a hydrogen powered fuel cell or combustion engine that operates in a safe and efficient manner and which can be easily refueled through the addition of more aqueous solution.

The aqueous solution employed in this approach is alkaline sodium borohydride ($NaBH_4$, tetrahydroborate). When solutions of aqueous $NaBH_4$ are reacted with metal or metal boride catalysts, these solutions hydrolyze to produce hydrogen gas and sodium borate which is water-soluble and environmentally safe. The overall reaction is:

The above reaction is inorganic and yields no products which might harm the operation of a fuel cell, such as sulfur, carbon monoxide, or aromatics.

Stable $NaBH_4$ solutions do not produce hydrogen unless contacted with a catalyst. While various metal salts may be employed as a catalyst in this hydrogen producing reaction, it has been found that the environmentally safe element ruthenium (Ru) is able to liberate hydrogen from borohydride solutions most rapidly. The Ru catalyst is supported on ion exchange resin beads and allows the above hydrogen producing reaction to proceed when brought into contact with the $NaBH_4$ solution. This process allows hydrogen to be generated at close to ambient temperatures and is not plagued by the safety concerns of storing hydrogen through mechanical compression. In addition, because hydrogen is only produced as needed and because stabilized $NaBH_4$ solutions do not produce hydrogen when not in the presence of a catalyst, no hydrogen will be generated in the event of a spill and no hydrogen will be released in the event of a puncture. $NaBH_4$ solutions are nonflammable and can be easily stored in, for example, plastic containers. When $NaBH_4$ is exposed to the atmosphere or water, there is no possibility of dangerous reactions occurring.

Borohydride solutions are also favored because they are able to satisfy the large energy demands of, for example, a motor vehicle. However, the use of borohydride solutions to supply hydrogen to power a motor vehicle also presents operating and design issues that must be addressed. For example, the conditions under which the hydrogen producing reaction takes place must be such that the temperature of the effluent is kept above a predetermined temperature so as to prevent precipitation. The predetermined temperature is approximately negative (−) 32° C. but varies slightly depending on molar concentration. Thus, a need exists for a vehicle fuel delivery arrangement capable of preventing the effluent of such a hydrogen producing reaction from precipitating under extreme ambient temperatures below negative 32° C.

A further issue relating to the use of a borohydride solution as a source of hydrogen fuel is that a waste liquid of $NaBO_2$ remains after the catalytic operation. Such waste liquid is nonexplosive, and can be recovered and reprocessed into fresh borohydride solution. Thus, the fuel delivery system must account for storage of both the fresh borohydride fuel solution, as well as the resulting waste liquid. Such a requirement poses size and packaging problems when the system is used as a fuel source for a motor vehicle.

SUMMARY OF INVENTION

Accordingly, one aspect of the present invention is to provide a hydrogen fuel system for a vehicle capable of storing borohydride solution as well as recovering and holding waste liquid in a space efficient manner.

In accordance with another object of the present invention, a hydrogen fuel delivery system is provided having a fuel tank capable of separately holding both a borohydride fuel and waste liquid so that the fuel can be supplied to a reaction process to produce hydrogen, and the waste liquid by-product of the reaction can be held for subsequent recovery and disposal or refining. In accordance with yet another aspect of the present invention, the tank can be formed with an expandable internal member capable of holding within the same tank one of the fuel or waste liquid separate from the other. In addition, the member can be positioned such that heat from the collected waste liquid can be used to preheat the fuel.

Therefore, in accordance with these and other aspects, the present invention provides a fuel system for a vehicle having a reactor and separator system arranged to process a borohydride fuel mixture into hydrogen for use by a vehicle powerplant, the process also generating a waste liquid by-product. The fuel system includes a fuel tank coupled to the reactor and separator system, the fuel tank having a fuel inlet for receiving the borohydride fuel mixture into a fuel holding portion of an internal cavity, and a waste inlet arranged to receive the waste liquid into a waste liquid portion of the internal cavity. An expandable divider element is arranged to keep the fuel holding portion of the internal cavity separate from the waste liquid holding portion.

The present invention will be more fully understood upon reading the following detailed description of the preferred embodiment(s) in conjunction with the accompanying drawings.

DETAILED DESCRIPTION OF THE PREFERRED EMBODIMENTS

Figure 1:
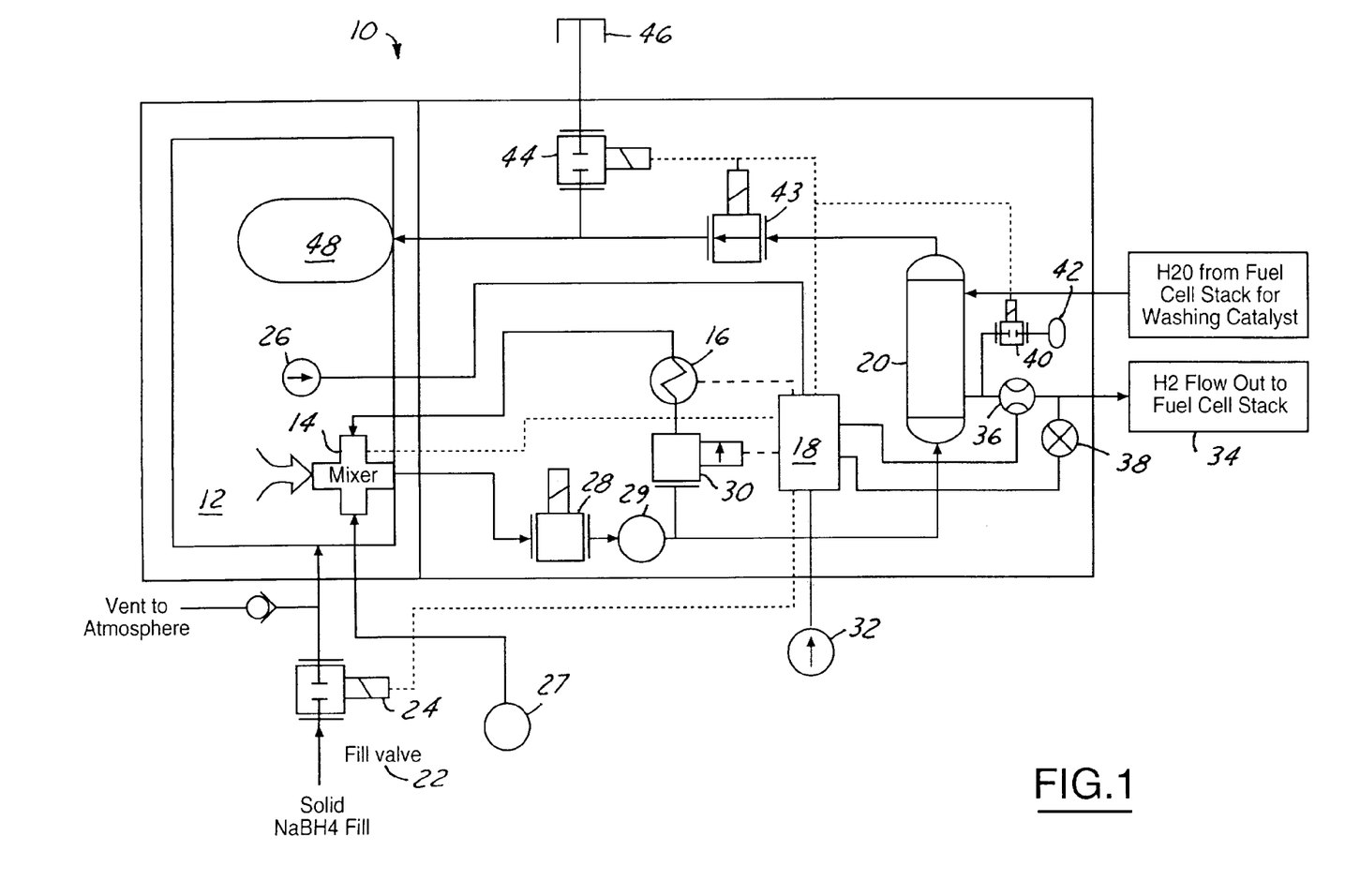
FIG. 1 is a schematic view of a first exemplary hydrogen fuel system in accordance with the present invention.

FIG. 1 illustrates an exemplary vehicle hydrogen fuel system 10 for producing hydrogen fuel in accordance with the present invention. More specifically, hydrogen fuel system 10 includes a main fuel tank 12, a mixer 14, an electric heater 16, a controller 18, and a reaction and separation tank 20.

The main fuel tank 12 receives solid $NaBH_4$ through a fill valve 22 at an $NaBH_4$ fill point 24. Tank 12 can be insulated to facilitate temperature control of the fluids held therein. The temperature of the main fuel tank 12 is monitored by a fuel temperature sensor 26. The fuel temperature sensor 26 can be activated by the controller 18 when the ambient temperature reaches a predetermined critical point. The ambient temperature is measured using an ambient temperature sensor 32. The fuel temperature sensor 26 also monitors the temperature of the effluent contained in a flexible accumulator 48 which is disposed within the main fuel tank 12. The flexible accumulator can be insulated separately from the main tank.

From the main fuel tank 12, $NaBH_4$ flows to the mixer 14. At the mixer 14, the $NaBH_4$ is mixed with water from a reservoir or fuel cell stack 27. From the mixer 14, a mixture of $NaBH_4$ and water passes through a solenoid control valve 28 and a pump 29. If the ambient and fuel temperatures are at or above a predetermined temperature, as detected by sensors 26 and 32, the controller 18 routes the mixture to the reaction and separation tank 20. In one application, the predetermined temperature is approximately negative 32° C. If the fuel temperature is below the predetermined temperature, the controller 18 activates the electric heater 16 as well as a heater/return flow valve 30. The heater/return flow valve 30 causes the mixture to return to the mixer 14. Once the fuel temperature is at or above the predetermined temperature, the mixture is allowed to pass through the heater/return valve 30 to the reaction and separation tank 20. The heated mixture keeps the effluent warm.

At the reaction and separation tank 20, a catalyst (not shown) preferably in the form of a ruthenium catalyst is added to the water/$NaBH_2$ fuel mixture to initiate a reaction yielding hydrogen and a waste fluid of sodium metaborate ($NaBO_2$). From the reaction and separation tank 20, hydrogen is output as needed to the vehicle's engine and/or a fuel cell stack 34. As the hydrogen flows from the reaction and separation tank 20, it is monitored by a hydrogen flow sensor 36 and a hydrogen pressure sensor 38. The hydrogen flow sensor 36 transfers hydrogen flowrate information to the controller 18. In the same manner the hydrogen pressure sensor 38 transfers information as to the pressure of the hydrogen to the controller 18. To ensure that a supply of hydrogen is present to immediately comply with a request from the fuel cell controller, a hydrogen buffer valve 40 can be opened so as to fill a hydrogen buffer 42 with hydrogen.

As noted above, in addition to hydrogen, the reaction which takes place in the reaction separation tank 20 also yields a waste fluid in the form of $NaBO_2$. The $NaBO_2$ travels from the reaction separation tank 20 to a $NaBO_2$ solenoid control valve 43. The opening and closing of the $NaBO_2$ solenoid control valve 43 is controlled by the controller 18. From the $NaBO_2$ solenoid control valve 43 the $NaBO_2$ can be selectively drained through a drain valve 44 to a drain port 46. $NaBO_2$ which is not diverted to drain valve 44 returns to the flexible accumulator 48 of main fuel tank 12.

Figure 2:
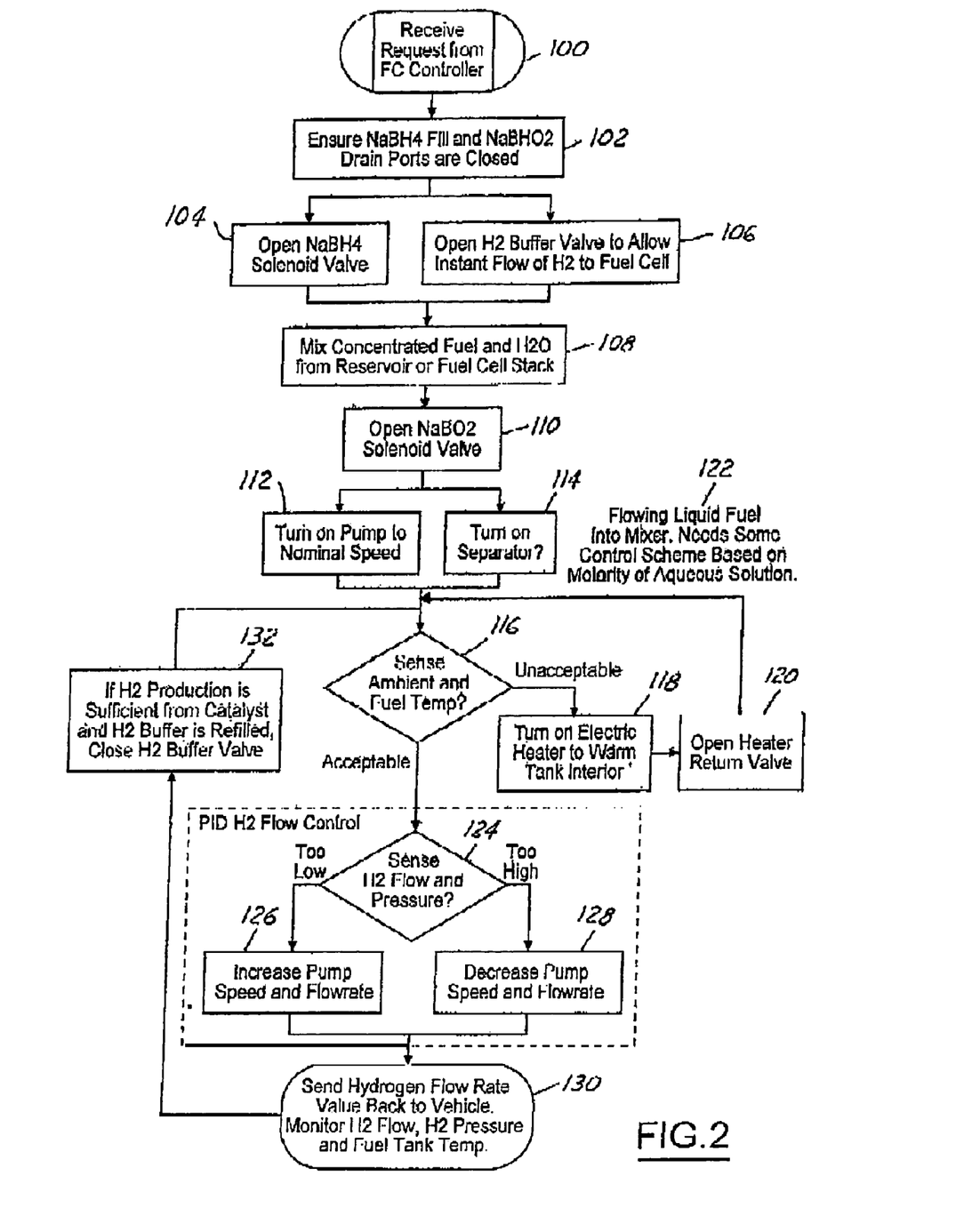
FIG. 2 is a flow diagram illustrating a control logic for the fuel system of FIG. 1.

FIG. 2 illustrates an exemplary control logic in accordance with one aspect of the present invention. The method is entered at block 100 by a fuel cell/engine controller which makes a command request for additional hydrogen fuel to the controller 18. The methodology proceeds to block 102 where the controller 18 employs a control signal to ensure that the $NaBH_4$ fill point 24 and the $NaBO_2$ drain port 46 are closed. The methodology next proceeds simultaneously to blocks 104 and 106. At block 104 the $NaBH_4$ solenoid valve 43 is opened, while at block 106 the hydrogen buffer valve 40 is opened to allow instant flow of hydrogen to the engine/fuel cell 34. At block 108, the concentrated fuel and water is mixed from a reservoir or fuel cell stack in the mixer 14. At block 110 the $NaBO_2$ solenoid valve 43 is opened. The methodology next simultaneously proceeds to blocks 112 and 114 to activate pump 29 to operate at normal speed, as well as a separator in the reaction separation tank 20, if required.

At block 116 the methodology next determines the ambient temperature and fuel temperature using the fuel temperature sensor 26 and the ambient temperature sensor 32. If the temperatures are deemed acceptable then the methodology proceeds to block 124. However, if the ambient and fuel temperatures are deemed unacceptable, the methodology proceeds to block 118. At block 118 the electric heater 16 is engaged to warm the tank interior by circulating aqueous $NaBH_4$ between the heater 16 and the mixer 14 (contained within fuel tank 12). After the electric heater 16 is engaged, the methodology proceeds to block 120 where the heater return valve is opened. From block 120, the methodology returns to block 116 to again sense the temperatures. If the temperatures are again outside an acceptable level, the methodology repeats the steps of blocks 118 and 120. If the temperatures are deemed to be acceptable, the methodology proceeds to block 124.

At block 124 hydrogen flow and pressure values are monitored using the hydrogen flow sensor 36 and the hydrogen pressure sensor 38. If the flow and pressure of the hydrogen is determined to be too low, the methodology proceeds to block 126. At block 126, the methodology increases the pump speed and the flowrate. However, if the hydrogen flow and pressure is determined to be too high, the methodology proceeds to block 128. At block 128 the pump speed and flowrate are decreased.

Once proper flow and pressure control is obtained at blocks 124, 126, and 128, then as denoted at block 130, the hydrogen flow rate information is sent back to the vehicle fuel cell controller, the hydrogen flow is monitored using the flow sensor 36, the hydrogen pressure is monitored using the pressure sensor 38, and the fuel tank temperature is monitored using the fuel temperature sensor 26. From block 130 the methodology proceeds to block 132. At block 132 the hydrogen buffer valve 40 is closed, but only if hydrogen production is sufficient and if the hydrogen buffer is refilled. From block 132 the methodology again returns to block 116 where the ambient and fuel temperatures are monitored.

As described above, the fuel input into the vehicle is the form of a concentrated fuel. However, those skilled in the art will readily appreciate that the teachings of the present invention are equally applicable for input of a solid fuel or aqueous/liquid fuel (e.g., a pre-mixed liquid form). Where fuel is utilized in a liquid form, system 10 would not need mixer 14. The liquid fuel would be input into main tank 12, and subsequently pumped as needed. In addition, block 108 is omitted as the aqueous fuel need not be further mixed with water. At block 118 the electric heater 16 is engaged to warm the tank by circulating aqueous $NaBH_4$ between the heater 16 and the fuel tank 12. The heater/return valve is closed by the controller to allow the warmed aqueous fuel to flow into the hydrogen generator system.

Figure 3:
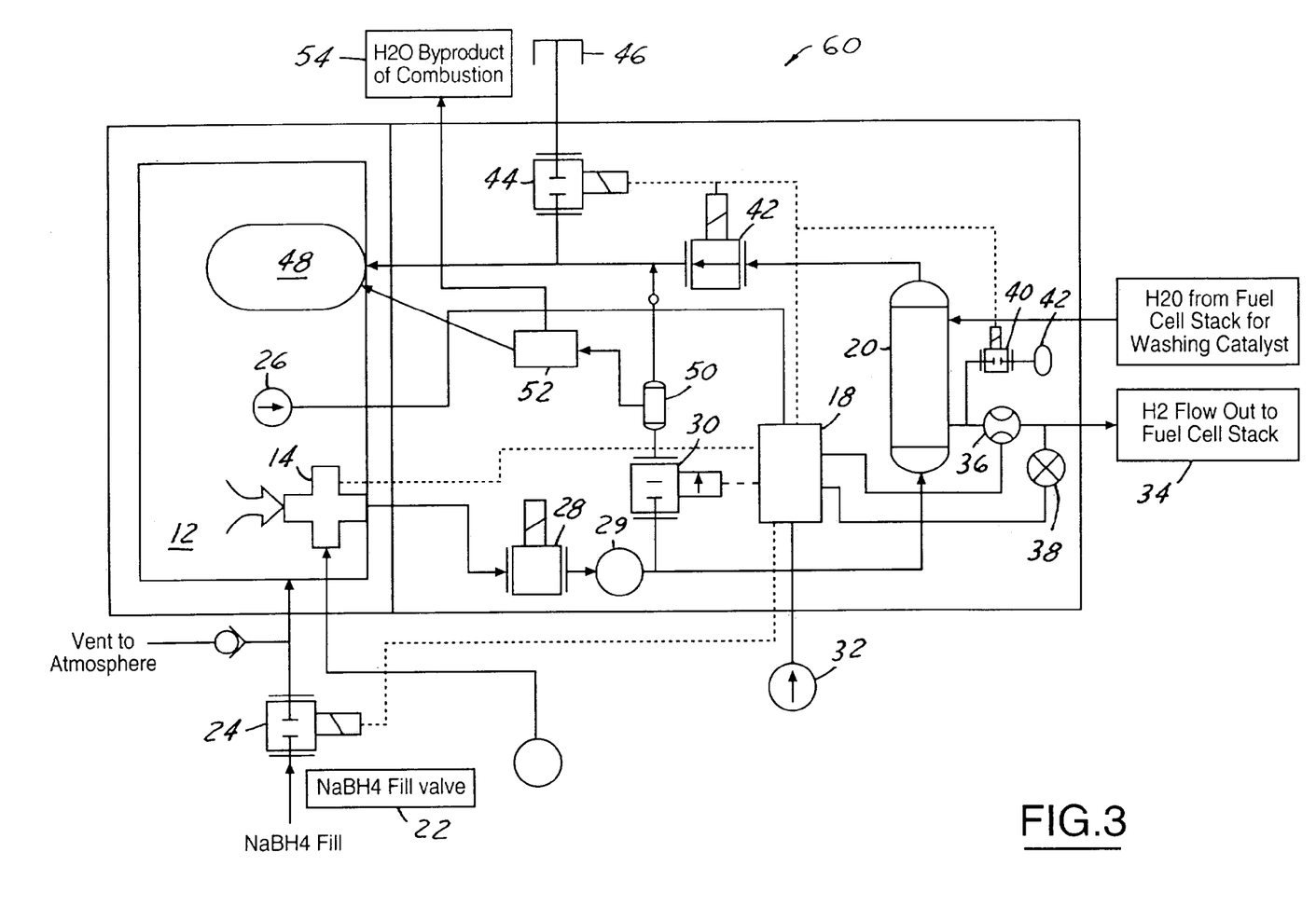
FIG. 3 is a schematic view of a second exemplary hydrogen fuel system in accordance with the present invention.
Figure 4:
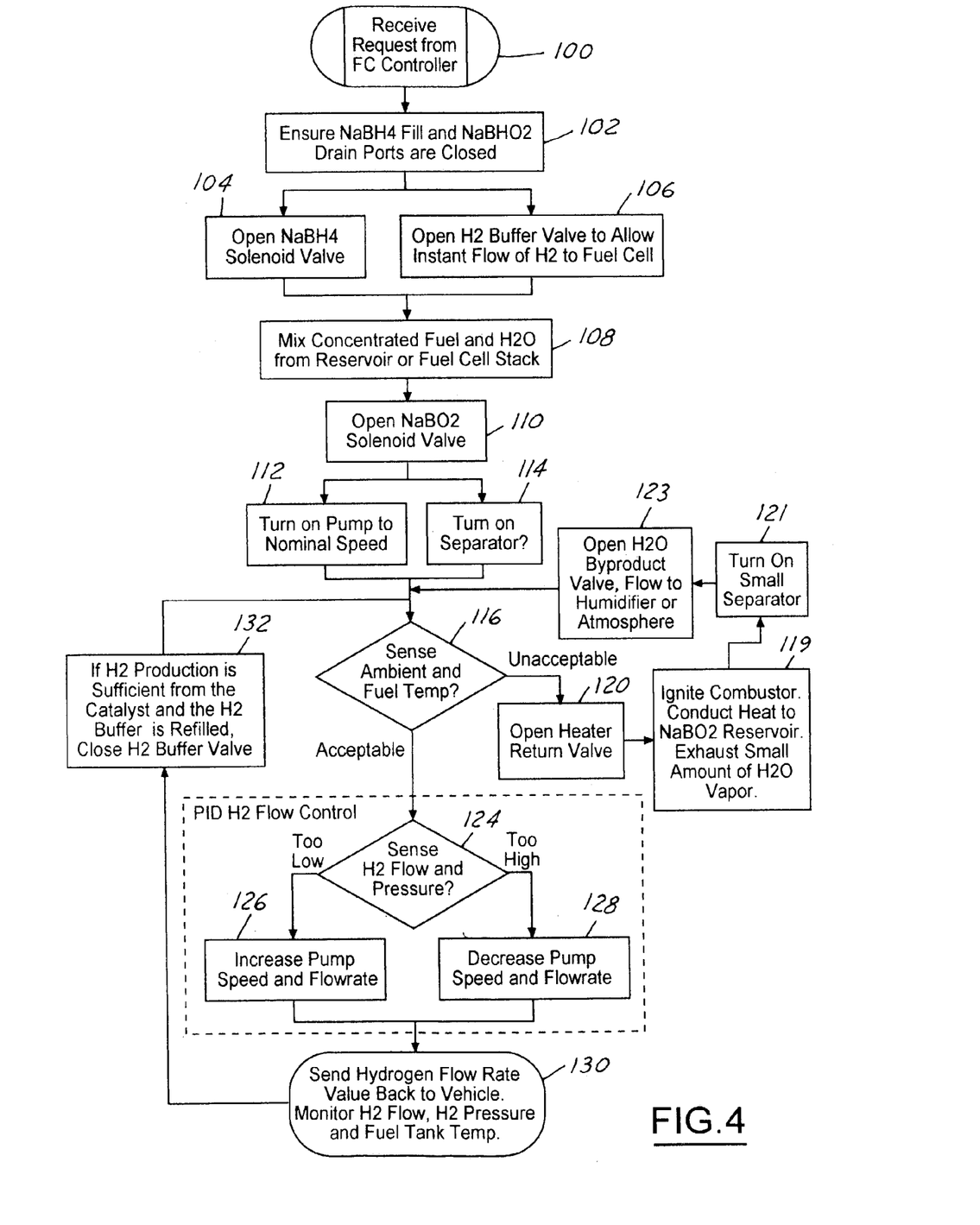
FIG. 4 is a flow diagram illustrating a control logic for the fuel system of FIG. 3.

Turning now to FIGS. 3 and 4, a hydrogen fuel system 60 is shown in accordance with a second embodiment of the present invention. System 60 is substantially similar to system 10 described above with the exception that system 60 utilizes heat produced by hydrogen combustion rather than by an electric heater. For this reason, common reference numbers are used to identify substantially identical elements or steps in FIGS. 3 and 4.

FIG. 3 depicts a hydrogen fuel system 60 to generally include a fuel tank 12, a mixer 14, a controller 18, a reaction and separation tank 20, a small catalyst and separation tank 50, and a combustor 52.

The operation of the second embodiment is substantially similar to operation of the first embodiment. The second embodiment differs from the first embodiment by the manner in which it controls the temperature of the effluent. In the second embodiment, once the controller 18 senses the ambient and fuel temperatures to be unacceptable, a signal is sent to open a heater return valve 30. After the heater return valve 30 is opened, the controller 18 ignites combustor 52. The heat produced by combustor 52 is then conducted to flexible accumulator 48 to insure that the temperature of the $NaBH_4$ effluent does not enter a frozen or precipitated state. Once the combustor is ignited, the controller activates the small catalyst and separation tank 50. The small catalyst and separation tank 50 introduces Ru to the water/$NaBH_4$ mixture so as to initiate a reaction. The reaction of the small catalyst and separation tank 50 produces hydrogen to fuel the combustor 52 and releases $NaBO_2$ effluent to flexible accumulator 48. In addition, a water byproduct valve 54 is opened to release water vapor produced by combustor 52 to a humidifier or atmosphere. The small catalyst evolves the hydrogen to be combusted, thus producing heat and warming the waste liquid $NaBO_2$. Storing of the warmed $NaBO_2$ in the flexible accumulator 48 inside fuel tank 12 in turn warms the $NaBH_4$.

Once the controller senses the fuel temperature to be acceptable, the $NaBH_4/H_2O$ mixture is allowed to proceed to the reaction and separation tank 20. After the reaction at the reaction and separation tank 20 takes place, the hydrogen fuel system 60 operates in the same manner as the hydrogen fuel system 10 described above.

FIG. 4 illustrates the control logic for heating the effluent by combustion. The methodology of blocks 100 through 116 and 124 through 132 is substantially the same as described above in connection with FIG. 2. However, controller 18 senses (as denoted at block 116) that the fuel temperature is unacceptable, the methodology proceeds to block 120 where the controller 18 opens the heater return valve 30. The methodology next proceeds to block 119 where combustor 52 is ignited and the heat produced by the combustor 52 is conducted to heat the waste liquid/$NaBO_2$ reservoir stored in the flexible accumulator 48. At this point, a small amount of water vapor is released from the combustor. Proceeding to block 121, the methodology activates the small catalyst and separation tank 50. The methodology next proceeds to block 123 where the water byproduct valve 54 is opened to allow water to flow to a humidifier or atmosphere. After block 123, the methodology returns to block 116. At block 116 the controller 18 senses the ambient and fuel temperatures. If the temperatures are again unacceptable, the methodology repeats the steps outlined in blocks 120, 119, 121, and 123. If the ambient and fuel temperatures are acceptable the methodology proceeds to block 124.

As with the first embodiment described above, the fuel can be supplied to the fuel tank in concentrated or liquid/premixed form. Again, those skilled in the art will readily appreciate that the teachings of the present invention are equally applicable for solid fuel or aqueous fuel. Where aqueous fuel is utilized, the system 60 would not require mixer 14.

Figure 5:
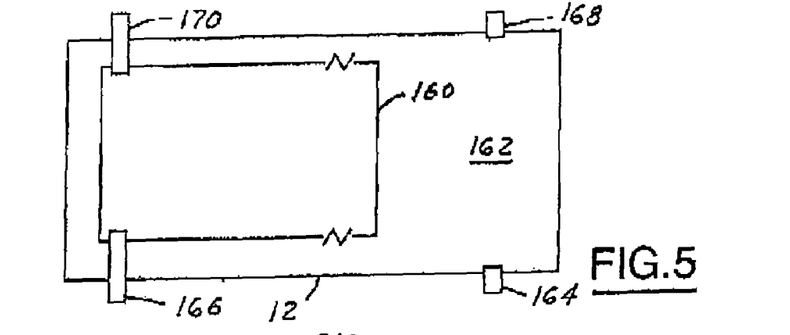
FIG. 5 is a cross-sectional block diagram of a main fuel storage tank in accordance with the present invention.

A block diagram of fuel tank 12 is provided in FIG. 5. As shown, tank 12 is provided with an expandable bladder 160 supported within an internal cavity 162 of the tank. The tank further includes an inlet port 164 for receiving solid or liquid fuel into cavity 162, and an inlet port 166 passing through the wall of tank 12 for coupling with bladder 160 to allow waste fluid to be received into the bladder. An outlet port 168 allows fuel to be pumped from cavity 162, and an outlet pump 170 passes through the wall of tank 12 for coupling with the bladder 160 to allow fluid therein to be removed (such as for subsequent off-vehicle recycling/recharging).

It will be appreciated that storage of the fuel in cavity 162 and the waste in bladder 160 is not to be construed as limiting, e.g., the fuel could be stored in bladder 160 and the waste fluid in cavity 162. Thus, in accordance with the present invention, the internal, expandable bladder operates to allow tank 12 to separately and simultaneously hold both the initial fuel and the resulting waste liquid by-product as the fuel is depleted. With this arrangement, physical space requirements of the tank/fuel system are optimized.

Figure 6:
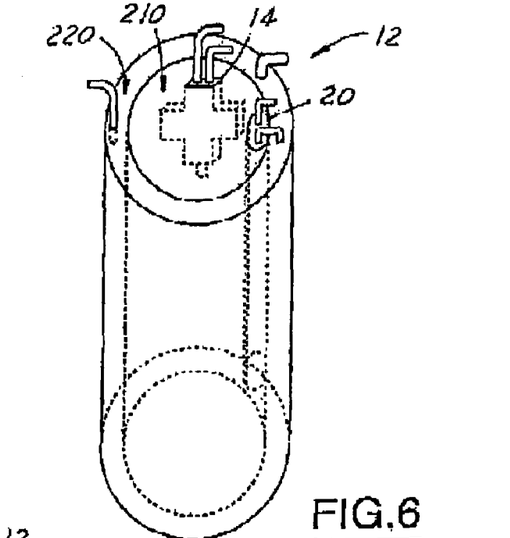
FIG. 6 is a simplified view of an exemplary embodiment of the fuel tank.

FIG. 6 depicts a simplified view of another exemplary fuel tank 12 embodiment. In this embodiment, fuel tank 12 is of a cylindrical shape containing an inner cylindrical cavity 210 and an outer cylindrical cavity 220. The inner cylindrical cavity 210 holds the $NaBH_4$ fuel while the outer cylindrical cavity 220 holds the $NaBO_2$ waste effluent. The terms inner and outer are used to describe the exemplary application. Importantly, the larger volume cavity holds the $NaBH_4$. Disposed within the inner cylindrical cavity 210 is the ruthenium catalyst and separator tank 20, and the mixer 14 (if needed). The barrier between the inner cylindrical cavity 210 and the outer cylindrical cavity 220 may be flexible so as to accommodate varying volumes and to provide added crashworthiness of the fuel tank 12.

Figure 7:
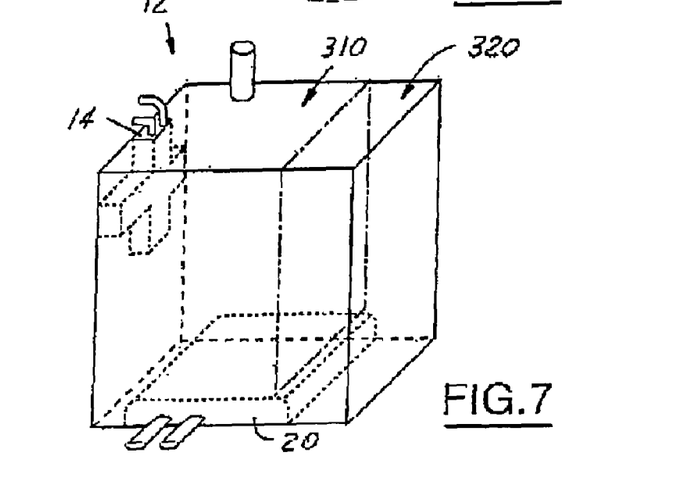
FIG. 7 is a simplified view of another exemplary embodiment of the fuel tank.

FIG. 7 depicts still another embodiment of the fuel tank 12. In this embodiment, fuel tank 12 has a cube shape and is divided into two cavities. The first cavity 310 stores the $NaBH_4$ fuel while second cavity 320 stores the $NaBO_2$ waste effluent. Disposed within the first cavity 310 is the mixer 14 (if needed). The ruthenium catalyst and separation tank 20 are disposed within the tank. Preferably, the barrier between the first cavity 310 and the second cavity 320 is flexible so as to accommodate varying volumes and to provide added crashworthiness of the fuel tank 12.

Figure 8:
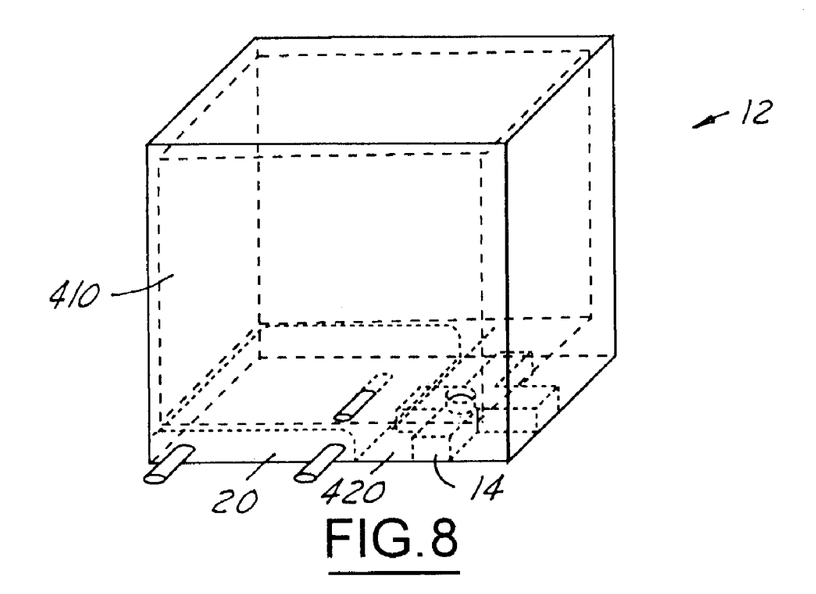
FIG. 8 is a simplified view of still another exemplary embodiment of the fuel tank.

FIG. 8 depicts yet another embodiment of the fuel tank 12. In this embodiment, fuel tank 12 is a square shape divided into two cavities. An inner cavity 410 holds the $NaBH_4$ fuel and an outer cavity 420, which surrounds the inner cavity 410, holds the $NaBO_2$ waste effluent. The barrier between the inner cavity 410 and the second cavity 420 is preferably flexible so as to accommodate varying volumes and to provide added crashworthiness of the fuel tank 12. Disposed within the outer cavity 420 is the mixer 14 (if needed) and the ruthenium catalyst and separation tank 20.

With the fuel tank embodiments of FIGS. 6 and 8, the $NaBO_2$ waste effluent surrounds the $NaBH_4$ fuel. This advantageously reduces the heating requirements for the $NaBH_4$ fuel because the $NaBO_2$ waste effluent naturally enters the accumulator 48 in a warmed state. By surrounding the inner cavity 210, 310 or 410, the associated "warmed" second cavity 220, 320 or 420 serves to pre-heat the $NaBH_4$ fuel. In addition, when using a fuel concentrate/water mixing arrangement, the water used to create aqueous $NaBH_4$ could be pre-heated to further reduce fuel heating needs prior to hydrogen separation. Likewise, such an arrangement may assist in preventing the water from freezing in ambient environments at or below 0° C.

More specifically, preheating the water required to create aqueous $NaBH_4$ may be accomplished by heating the water stored in reservoir 27. One skilled in the art would understand that the water may be heated by using an electric heater, heat generated by the combustion of hydrogen, waste heat from the vehicle system, or by some other means. However, it may also be accomplished by storing the water in a separate chamber within the heated fuel tank.

Figure 9:
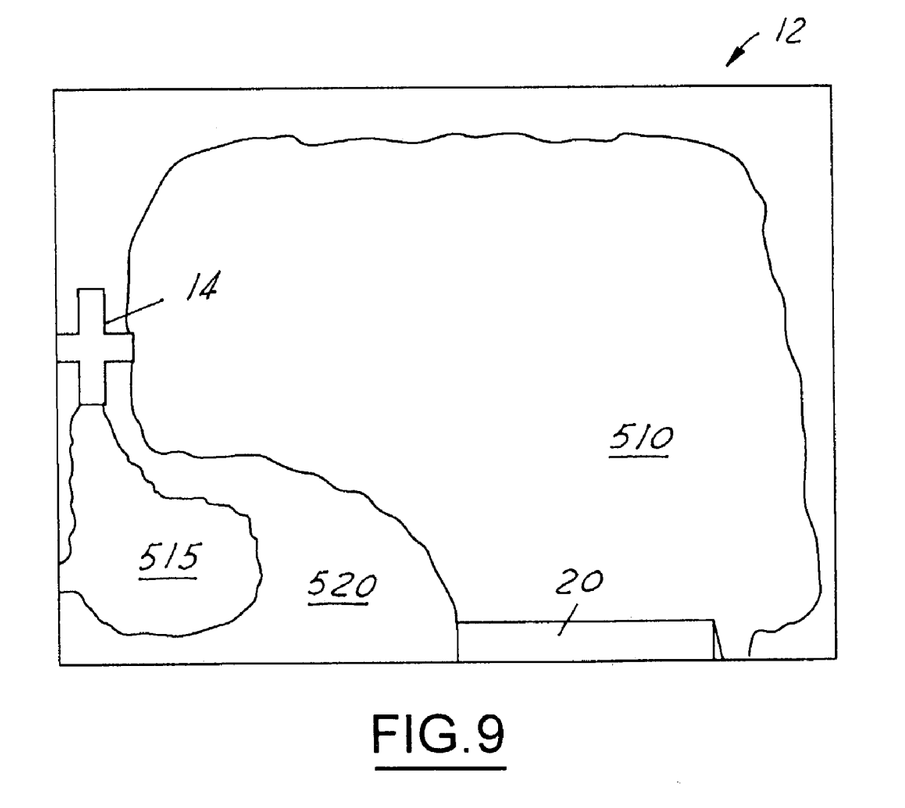
FIG. 9 is a simplified view of yet another exemplary embodiment of the fuel tank.

Accordingly, FIG. 9 depicts a simplified view of a fuel tank 12 embodiment which stores water in a separate chamber within the fuel tank. More specifically, in this embodiment fuel tank 12 is divided into 3 cavities. A first cavity 510 holds the fuel $NaBH_4$, and a second cavity 515 holds de-ionized water used for creating the aqueous $NaBH_4$. A third cavity 520, which contains the waste effluent $NaBO_2$, surrounds both the first cavity 510 and the second cavity 515. The barriers between both the first cavity 510 and the second cavity 515, and the third cavity 520, are preferably flexible so as to accommodate varying volumes and to provide added crashworthiness of the fuel tank 12. Disposed intermediate the first cavity 510 and third cavity 520 is the ruthenium catalyst and separation tank 20. Disposed within the third cavity 520, and between the first cavity 510 and the second cavity 515, is the mixer 14.

In this embodiment, warm effluent $NaBO_2$ surrounds both the de-ionized water and the fuel $NaBH_4$, thereby preheating both. In the event either or both the fuel $NaBH_4$, and the de-ionized water require additional heating, heater 16 of the first embodiment circulates aqueous $NaBH_4$ back through a connection to the mixer 14.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. A fuel system for vehicle having a reactor and separator system arranged to process a borohydride fuel mixture into hydrogen for use by a vehicle powerplant, the process also generating a waste liquid by-product, wherein the fuel system comprises:

a fuel tank coupled to the reactor and separator system, the fuel tank having a fuel inlet for receiving the borohydride fuel mixture into a fuel holding portion of an internal cavity, and a waste inlet arranged to receive the waste liquid into a waste liquid portion of the internal cavity;

an expandable divider element arranged to keep the fuel holding portion of the internal cavity separate from the waste liquid holding portion;

a mixer in fluid communication with the fuel tank, a source of a borohydride concentrate, and a source of liquid, the mixer operative to mix the concentrate and liquid to form the borohydride fuel mixture;

a temperature sensor arranged to produce a signal indicative of the temperature of the borohydride fuel held in the fuel tank; a heater positioned between the fuel tank and the reactor and separator system, the heater arranged to heat to the borohydride fuel mixture; a control valve coupled to a feedback arrangement extending between the reaction and separator system and the fuel tank; and a controller for recirculating the mixture from the control valve to the mixer until the mixture is above a predetermined temperature.

2. The system of claim 1 wherein the predetermined temperature is approximately negative 32° C.

3. The system of claim 1 wherein the heater comprises an electric heater.

4. The system of claim 1 wherein the heater comprises a combustor.

5. The system of claim 1 wherein the reactor and separator system includes an Ru catalyst.

6. The system of claim 1 further comprising a hydrogen buffer coupled to the reactor and separator system for storing a predetermined amount of generated hydrogen.

7. The system of claim 1 wherein the expandable divider element comprises an expandable bladder having an inner cavity defining one of the holding portions.

8. The system of claim 1 wherein the waste liquid holding portion is positioned within the internal cavity of the fuel tank so as to be in a heat exchange relationship with the fuel holding portion.

9. The system of claim 8 wherein the waste liquid holding portion surrounds the fuel holding portion.

* * * * *